United States Patent
Lynch et al.

(10) Patent No.: US 6,759,361 B2
(45) Date of Patent: Jul. 6, 2004

(54) ALUMINOBORONATE ACTIVATORS FOR SINGLE-SITE OLEFIN POLYMERIZATION CATALYSTS

(75) Inventors: Michael W. Lynch, West Chester, OH (US); Craig C. Meverden, Mason, OH (US); Sandor Nagy, Mason, OH (US); Karen L. Neal-Hawkins, Cincinnati, OH (US)

(73) Assignee: Equistar Chemicals, LP, Houston, TX (US)

( * ) Notice: Subject to any disclaimer, the term of this patent is extended or adjusted under 35 U.S.C. 154(b) by 473 days.

(21) Appl. No.: 09/873,713

(22) Filed: Jun. 4, 2001

(65) Prior Publication Data

US 2003/0004052 A1 Jan. 2, 2003

(51) Int. Cl.[7] .......................... B01J 31/00; B01J 37/00; C08F 4/02; C08F 4/50
(52) U.S. Cl. ..................... 502/102; 502/103; 502/42; 502/125; 502/128; 502/132
(58) Field of Search ................. 502/102, 103, 502/117, 125, 128, 132

(56) References Cited

U.S. PATENT DOCUMENTS

| | | | |
|---|---|---|---|
| 4,752,597 A | 6/1988 | Turner | 502/104 |
| 4,791,180 A | 12/1988 | Turner | 526/160 |
| 5,153,157 A | 10/1992 | Hlatky et al. | 502/117 |
| 5,198,401 A | 3/1993 | Turner et al. | 502/155 |
| 5,241,025 A | 8/1993 | Hlatky et al. | 526/129 |
| 5,414,180 A | 5/1995 | Geerts et al. | 585/525 |
| 5,539,124 A | 7/1996 | Etherton et al. | 548/402 |
| 5,554,775 A | 9/1996 | Krishnamurti et al. | 556/7 |
| 5,637,659 A | 6/1997 | Krishnamurti et al. | 526/133 |
| 5,637,660 A | 6/1997 | Nagy et al. | 526/160 |
| 5,648,440 A | 7/1997 | Sugano et al. | 526/132 |
| 5,902,866 A | 5/1999 | Nagy et al. | 526/133 |
| 6,034,027 A | 3/2000 | Krishnamurti et al. | 502/200 |
| 6,211,311 B1 * | 4/2001 | Wang et al. | 502/152 |
| 6,232,260 B1 | 5/2001 | Nagy et al. | 502/155 |
| 6,451,724 B1 * | 9/2002 | Nifant'ev et al. | 502/103 |
| 6,559,251 B1 * | 5/2003 | Wang et al. | 502/103 |

FOREIGN PATENT DOCUMENTS

| | | |
|---|---|---|
| WO | WO 99/24446 | 5/1999 |
| WO | WO 01/53360 A1 * | 7/2001 |

OTHER PUBLICATIONS

Anulewicz–Ostrowski et al., *Inorg. Chem.* 39 (2000) 5763.
S. Lulinski et al., "Aluminoxanes via Boron Compounds" in *Contemporary Boron Chemistry* (2000) 40.
Ng. Buu–Hoi et al., *J. Chem. Soc.* (1952) 2225.

* cited by examiner

*Primary Examiner*—Mark L. Bell
*Assistant Examiner*—J. Pasterczyk
(74) *Attorney, Agent, or Firm*—Jonathan L. Schuchardt

(57) ABSTRACT

Single-site catalyst systems useful for polymerizing olefins are disclosed. The catalyst systems comprise an organometallic complex and an activator. The complex includes a Group 3–10 transition metal, M, and at least one indenoindolyl ligand that is pi-bonded to M. The activator is a reaction product of

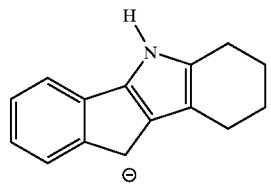

an indeno[1,2-b]indolyl ligand an alkylaluminum compound and an organoboronic acid. Catalyst systems of the invention significantly outperform known catalyst systems that employ a metallocene complex and similar aluminoboronate activators.

15 Claims, No Drawings

ALUMINOBORONATE ACTIVATORS FOR SINGLE-SITE OLEFIN POLYMERIZATION CATALYSTS

FIELD OF THE INVENTION

The invention relates to catalyst systems useful for polymerizing olefins. The catalyst systems include (1) a complex, which incorporates at least one indenoindolyl ligand, and (2) an aluminoboronate activator, which is the reaction product of an organoboronic acid and an alkylaluminum compound.

BACKGROUND OF THE INVENTION

While Ziegler-Natta catalysts are a mainstay for polyolefin manufacture, single-site (metallocene and non-metallocene) catalysts represent the industry's future. These catalysts are often more reactive than Ziegler-Natta catalysts, and they produce polymers with improved physical properties. The improved properties include narrow molecular weight distribution, reduced low molecular weight extractables, enhanced incorporation of α-olefin comonomers, lower polymer density, controlled content and distribution of long-chain branching, and modified melt rheology and relaxation characteristics.

Recently, non-metallocene, single-site catalysts that incorporate a Group 3–10 transition metal and pi-bonded heterocyclic ligands that are isolobal with the cyclopentadienide anion have been described. Examples of such "Cp-like" ligands are boraaryl (see U.S. Pat. Nos. 5,554,775 and 6,034,027), azaborolinyl (U.S. Pat. No. 5,902,866), and indenoindolyl (U.S. Pat. No. 6,232,260; see also PCT Internat. Appl. WO 99/24446). Indenoindoles having a wide variety of substituent groups are easy to synthesize. Because substituent effects are readily exploited, the corresponding indenoindolyl complexes can be fine-tuned to achieve higher activity or to make polymers with a desired set of physical properties.

Single-site catalysts, including those containing indenoindolyl ligands, have traditionally been used with only a limited variety of activators. An important function of the activator is to generate a non-coordinating or weakly coordinating counterion for the cationic polymerization site. The activator helps in achieving an acceptable catalyst productivity. Usually, the activator is an alkyl alumoxane (e.g., methyl alumoxane), or an ionic borate or aluminate (e.g., trityl tetrakis(pentafluorophenyl)borate). Unfortunately, alumoxanes are normally required in large excess, i.e., hundreds or even thousands of times the molar amount of the transition metal complex, which makes the catalyst system expensive. Ionic borates are sometimes more efficient than alumoxanes, but they are often costly to synthesize.

Recently, reaction products of organoboronic acids and alkylaluminum compounds (hereinafter sometimes called "aluminoboronates") have been suggested as catalyst components for olefin polymerizations. For example, U.S. Pat. No. 5,414,180 teaches to react an alkyl- or arylboronic acid with a trialkylaluminum compound, and to use the reaction product in a metallocene-catalyzed olefin polymerization process. The metallocene complex used is typically bis(cyclopentadienyl)zirconium dichloride. In another example, U.S. Pat. No. 5,648,440 describes reaction products of organoboronic acids and trialkylaluminums and the use of these products as activators for bridged and unbridged metallocene complexes. This reference suggests that an advantage of these aluminoboronates is the ability to reduce the aluminum to transition metal mole ratio [Al:M] needed for satisfactory activity. Still unclear, however, is how well these aluminoboronate activators would perform with non-metallocene, single-site catalysts based on indenoindolyl ligands.

In sum, improved catalyst systems for polymerizing olefins are needed. Preferably, the catalyst systems would avoid the need for conventional activators, which are expensive to use. Ideally, the catalyst systems would take advantage of the flexibility of indenoindolyl ligand-containing complexes and would give polyolefins with a favorable balance of physical properties.

SUMMARY OF THE INVENTION

The invention is a catalyst system useful for polymerizing olefins. The catalyst system comprises an organometallic complex and an activator. The complex includes a Group 3–10 transition metal, M, and at least one indenoindolyl ligand that is pi-bonded to M. The activator is an "aluminoboronate," a reaction product of an alkylaluminum compound and an organoboronic acid.

We surprisingly found that catalyst systems of the invention significantly outperform known catalyst systems that employ a metallocene complex (e.g., bis(cyclopentadienyl)zirconium dichloride) and aluminoboronate activators. Moreover, we found that the aluminoboronate activators can be used to boost the performance of an alumoxane-activated catalyst system.

DETAILED DESCRIPTION OF THE INVENTION

Catalyst systems of the invention comprise an organometallic complex and an activator. The complex is "single site" in nature, i.e., it is a distinct chemical species rather than a mixture of different species. Single-site catalysts, which include metallocenes, typically give polyolefins with characteristically narrow molecular weight distributions (Mw/Mn<3) and good, uniform comonomer incorporation.

The organometallic complex includes a Group 3 to 10 transition metal, M. "Transition metal" as used herein includes elements of the lanthanide and actinide series. More preferred complexes include a Group 4 to 10 transition metal. Group 4 complexes are particularly preferred.

The complex includes at least one anionic indenoindolyl ligand. These ligands are prepared by deprotonating an indenoindole compound using a potent base. By "indenoindole compound," we mean an organic compound that has both indole and indene rings. The five-membered rings from each are fused, i.e., they share two carbon atoms. Preferably, the rings are fused such that the indole nitrogen and the only sp³-hybridized carbon on the indenyl ring are "trans" to each other. Such is the case in an indeno[1,2-b] ring system such as:

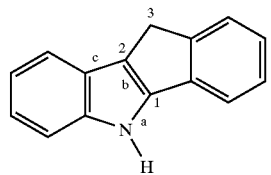

Suitable ring systems also include those in which the indole nitrogen and the sp³-hybridized carbon of the indene are beta to each other, i.e., they are on the same side of the molecule. This is an indeno[2,1-b]indole ring system:

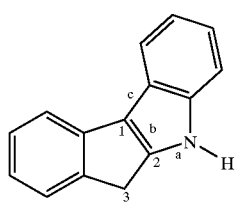

The ring atoms can be unsubstituted or substituted with one or more groups such as alkyl, aryl, aralkyl, halogen, silyl, nitro, dialkylamino, diarylamino, alkoxy, aryloxy, thioether, or the like. Additional fused rings can be present, as long as an indenoindole moiety is present.

Numbering of indenoindoles follows IUPAC Rule A-22. The molecule is oriented as shown below, and numbering is done clockwise beginning with the ring at the uppermost right of the structure in a manner effective to give the lowest possible number to the heteroatom. Thus, 5,10-dihydroindeno[1,2-b]indole is numbered as follows:

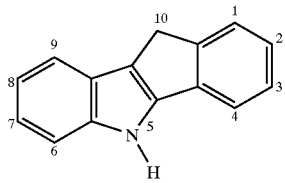

while 5,6-dihydroindeno[2,1-b]indole has the numbering:

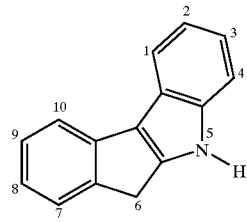

For correct nomenclature and numbering of these ring systems, see the *Ring Systems Handbook* (1998), a publication of Chemical Abstracts Service, Ring Systems File II: RF 33986-RF 66391 at RF 58952. (Other examples of correct numbering appear in PCT Int. Appl. WO 99/24446.)

Suitable indenoindole compounds that are precursors to indenoindolyl ligands include, for example, 5-methyl-5,10-dihydroindeno[1,2-b]indole, 5-phenyl-5,6-dihydroindeno[2,1-b]indole, 4,7-dimethyl-5-phenyl-5, 10-dihydroindeno[1,2-b]indole, 4-tert-butyl-5,8-dimethyl-5,10-dihydroindeno[1,2-b]indole, 4,8-dichloro-5, 10-dihydro-indeno[1,2-b]indole, 2,7-dimethyl-5,6-dihydroindeno[2,1-b]indole, and the like.

Methods for making indenoindole compounds are well known. Suitable methods are disclosed, for example, in U.S. Pat. No. 6,232,260, the teachings of which are incorporated herein by reference, and references cited therein, including the method of Buu-Hoi and Xuong, *J. Chem. Soc.* (1952) 2225. Suitable procedures also appear in PCT Int. Appl. WO 99/24446.

In addition to an indenoindolyl ligand, the organometallic complex may include additional labile or polymerization-stable, anionic ligands. Polymerization-stable ligands include, for example, substituted and unsubstituted cyclopentadienyl, fluorenyl, and indenyl, or the like, such as those described in U.S. Pat. Nos. 4,791,180 and 4,752,597, the teachings of which are incorporated herein by reference. Suitable polymerization-stable ligands include heteroatomic ligands such as boraaryl, pyrrolyl, indolyl, quinolinoxy, pyridinoxy, and azaborolinyl as described in U.S. Pat. Nos. 5,554,775, 5,539,124, 5,637,660, and 5,902,866, the teachings of which are incorporated herein by reference. The organometallic complex usually includes one or more labile ligands such as halides, alkoxys, aryloxys, alkyls, alkaryls, aryls, dialkylaminos, or the like. Particularly preferred are halides, alkyls, and alkaryls (e.g., chloride, methyl, benzyl).

The indenoindolyl ligand can be bridged to another ligand. Preferably, the other ligand is a second indenoindolyl ligand or one of the polymerization-stable ligands described above.

The catalyst system includes an aluminoboronate activator. The activator helps to ionize the organometallic complex and activate the catalyst. "Aluminoboronate" as used herein means the reaction product of an organoboronic acid and an alkylaluminum compound. There are many possible structural variations of aluminoboronates depending upon what reactants are used, their relative proportions, and the conditions under which they are combined.

As used herein, "organoboronic acid" refers to boron compounds that have an organic moiety and at least one B—OH group. Examples include both boronic acids, which have at least one —B(OH)$_2$ group, and borinic acids, which have at least one group in which a single hydroxyl group is attached to boron. Preferred organoboronic acids are alkyl- and arylboronic acids of the structure R—B(OH)$_2$ in which R is a $C_1$–$C_{30}$ hydrocarbyl or halogenated hydrocarbyl group. Examples of suitable organoboronic acids are methylboronic acid, ethylboronic acid, n-butylboronic acid, phenylboronic acid, p-styrylboronic acid, cyclohexylboronic acid, 3,5-difluorophenylboronic acid, pentafluorophenylboronic acid, 1,4-butylenebis(boronic acid), 1,4-phenylene-bis(boronic acid), dimethylborinic acid, diphenylborinic acid, bis(3,5-difluorophenyl)borinic acid, bis (pentafluorophenyl)borinic acid, and the like. Additional examples of suitable organoboronic acids appear in U.S. Pat. Nos. 5,414,180 and 5,648,440, the teachings of which are incorporated herein by reference. Particularly preferred organoboronic acids, because of their ability to impart excellent activity to the catalyst systems, are polyfluoroaryl boronic acids such as 1,3,5-trifluorophenylboronic acid or pentafluorophenylboronic acid.

The organoboronic acid is reacted with an alkylaluminum compound to produce the aluminoboronate activator. Suitable alkylaluminum compounds are well known. They include compounds having at least one R—Al bond in which R is an organic radical. Specific classes of suitable alkylaluminum compounds include trialkylaluminums (e.g., trimethylaluminum, triethylaluminum), alkylaluminum halides (e.g., diethylaluminum chloride, ethylaluminum dichloride), alkylaluminum hydrides (e.g., dimethylaluminum hydride), alkylaluminum siloxides (e.g., dimethylaluminum triethylsiloxide), and tetraalkylalumoxanes (e.g., tetramethyl alumoxane). Trialkylaluminums, especially trimethyl-aluminum, triethylaluminum, and triisobutylaluminum, are preferred.

The preparation of the aluminoboronate activators is straightforward. Usually, they are prepared in a single step by carefully combining the organoboronic acid and the alkylaluminum compound in the desired mole ratio, usually under an inert atmosphere in the presence of a dry organic solvent, according to methods known in the art. Suitable methods for making the aluminoboronates are outlined in U.S. Pat. Nos. 5,648,440 and 5,414,180, the teachings of which are incorporated herein by reference. Usually, the reactants are combined in a manner effective to give an aluminoboronate product that incorporates one or two aluminum atoms per boron atom. In a preferred approach, an excess of the alkylaluminum compound is used so that the product is a mixture of the aluminoboronate and some unreacted alkylaluminum compound. The Al:B molar ratio in such mixutures is preferably from about 2 to 50, more preferably from about 2 to 10. Example 1 below illustrates the preparation of a suitable aluminoboronate activator.

The optimum amount of aluminoboronate activator needed relative to the amount of organometallic complex depends on many factors, including the nature of the complex and activator, whether a supported catalyst is used, the desired reaction rate, the kind of polyolefin product, the reaction conditions, and other considerations. Generally, however, the amount used will be within the range of about 0.01 to about 5000 moles, preferably from about 0.1 to about 500 moles, of aluminum per mole of transition metal, M.

The aluminoboronate activator can be added to the reaction mixture at the start of the polymerization. If desired, it can be precontacted or prereacted with the organometallic complex prior to the polymerization reaction. When a supported catalyst system is used, the activator can be added to the reactor separately or it can be deposited onto the support before or after supporting the organometallic complex. Example 2 below illustrates one way of depositing the activator on a support, followed by combination of the activator-treated support with a solution of the organometallic complex.

The organometallic complex is prepared according to methods that are well known in the art. In general, the complexes are made by combining at least about one equivalent of an anionic indenoindolyl ligand with a transition metal source.

The indenoindolyl anion is produced by deprotonating a indenoindole compound with a potent base. Usually, about one equivalent of base is used, but an excess may be used. Suitable bases include alkali metals (e.g., sodium or potassium), alkali metal hydrides (sodium hydride, lithium hydride), alkali metal aluminum hydrides (lithium aluminum hydride), alkali metal alkyls (n-butyllithium, methyllithium), Grignard reagents (methyl magnesium bromide, phenyl magnesium chloride), and the like. The deprotonation step is normally performed at or below room temperature, preferably at about room temperature, by combining the indenoindole compound and the deprotonating agent, usually in the presence of one or more dry organic solvents, especially ethers and/or hydrocarbons.

Any convenient source of transition metal can be used. For example, the complexes can be made from transition metal halides, alkyls, alkoxides, acetates, amides, or the like. A particularly convenient source of the transition metal is the transition metal halide. For example, one can use titanium tetrachloride, zirconium tetrachloride, cyclopentadienylzirconium trichloride, tetrakis(dimethylamino) zirconium, vanadium(III) chloride-tetrahydrofuran complex $(VCl_3(THF)_3)$, titanium(III) chloride-THF complex, chromium(III) chloride-THF complex, cobalt(II) chloride, nickel(II) bromide, platinum(II) chloride, palladium(II) chloride, lanthanum(III) chloride, titanium(III) acetate, or the like. Complexes can also be prepared from salts with labile groups, such as tetrakis(acetonitrile)palladium(II) bis (tetrafluoroborate).

The transition metal complexes are easy to make. Usually, the transition metal source (halide, e.g.) is dissolved or suspended in an organic solvent and the anionic indenoindolyl ligand is carefully added. Refluxing is used if needed to complete the reaction. Insoluble by-products, if any, can be removed by filtration, solvents are evaporated, and the transition metal complex is isolated, washed, and dried. The resulting complex can generally be used without further purification.

The catalyst systems are optionally used with an inorganic solid or organic polymer support. Suitable supports include silica, alumina, silica-aluminas, aluminum phosphates, magnesia, titania, clays, zeolites, or the like. The supports can be pretreated thermally or chemically to improve catalyst productivity or product properties. Suitable supports and support treatment methods are described, for example, in U.S. Pat. No. 6,211,311, the teachings of which are incorporated herein by reference. The organometallic complex and activator(s) can be deposited on the support in any desired manner. For instance, the complex and/or activator can be dissolved in a solvent, combined with a support, and stripped. Alternatively, an incipient-wetness technique can be used. Moreover, the support can simply be introduced into the reactor separately from the catalyst.

Catalyst systems of the invention exhibit excellent activities. As Example 3 below illustrates, a supported indenoindolylzirconium complex, when activated with an aluminoboronate, has good activity (426 kg PE/g Zr/h at an Al:Zr molar ratio of 80) and incorporates 1-butene efficiently to give an ethylene polymer with low density and favorable melt-flow properties. A comparable metallocene catalyst system with a bis(cyclopentadienyl)zirconium complex, when activated with the same aluminoboronate, was much less active (47 kg PE/g Zr/h) as shown in Comparative Examples 4–5.

Catalyst systems of the invention have favorable activity compared with similar alumoxane-activated systems. Comparative Example 7 demonstrates that a large excess of PMAO (Al:Zr molar ratio=190) is needed to give an indenoindolylzirconium catalyst system with an activity comparable to that of an indenoindolylzirconium catalyst that is activated with an aluminoboronate (Example 3). With the catalyst system of the invention, a significantly reduced level of inexpensive triethylaluminum-based activator gives good activity.

The catalyst systems optionally include a second activator, which is used in addition to the aluminoboronate activator. Suitable second activators, which are well known, include alumoxanes, (methyl alumoxane (MAO), PMAO, ethyl alumoxane, diisobutyl alumoxane), alkylaluminum compounds (triethylaluminum, diethylaluminum chloride, trimethyl-aluminum, triisobutylaluminum), ionic borates or aluminates (e.g., lithium tetrakis(pentafluorophenyl)borate, anilinium tetrakis(pentafluorophenyl)-borate), and organoboranes (e.g., tris(pentafluorophenyl)borane, triphenylborane, tri-n-octylborane). These and other suitable boron-containing activators are described in U.S. Pat. Nos. 5,153,157, 5,198,401, and 5,241,025, the teachings of which are incorporated herein by reference. Preferably, the optional second activator is an alumoxane such as MAO.

We surprisingly found that the use of an aluminoboronate activator in combination with an alumoxane gives a catalyst system with exceptional activity when the molar ratio of aluminum to transition metal is taken into account. As Example 6 and Comparative Example 7 show, the use of a catalyst system of the invention permits more efficient utilization of commercially available methylalumoxane, which normally comprises 50% or more of the total raw material cost of the catalyst system. In Example 6, the catalyst had an activity of 651 kg PE/g Zr/h at a Al:Zr molar ratio of 50; in contrast, the catalyst of Comparative Example 7 had a somewhat lower activity of 501 kg PE/g Zr/h at a much higher Al:Zr molar ratio of 190.

Catalyst systems of the invention offer many advantages. First, the catalyst systems provide a low-cost alternative to many metallocene catalyst systems because both the organometallic complex and the aluminoboronate activator are easy to synthesize. Second, the catalyst systems provide an efficient, cost-effective alternative to using commercial alumoxanes. Third, high catalyst activity is achieved with a wide variety of supports. Fourth, the polymers made with the catalyst systems, especially LLDPE, have a favorable balance of physical properties, including favorable melt-flow characteristics, low densities, and narrow molecular weight distributions.

The invention includes an olefin polymerization process. The process comprises polymerizing an olefin in the presence of a catalyst system of the invention according to methods that are well known in the art. Olefins useful in the process of the invention are compounds having at least one polymerizable carbon-carbon double bond. Preferred olefins have a single carbon-carbon double bond. They include ethylene and $C_3$–$C_{20}$ α-olefins such as propylene, 1-butene, 1-hexene, 1-octene, and the like. Isoolefins (e.g., isobutene or isooctene) and cycloolefins (e.g., cyclohexene) are suitable as are cyclic olefins (e.g., norbornene) and dienes (e.g., 1,3-butadiene). Some or all of the olefin can be replaced with an acetylenically unsaturated monomer (e.g., 1-octyne or 1-hexyne). Mixtures of olefins can be used. Ethylene and mixtures of ethylene with $C_3$–$C_{10}$ α-olefins are especially preferred. Functionalized comomoners can be included provided that the comonomer also contains at least one polymerizable carbon-carbon double bond. Such functionalized monomers are used advantageously with late transition metal catalysts.

Many types of olefin polymerization processes can be used. Preferably, the process is practiced in the liquid phase, which can include slurry, solution, suspension, or bulk processes, or a combination of these. High-pressure fluid phase or gas phase techniques can also be used. The process of the invention is particularly valuable for solution and slurry processes. Suitable methods for polymerizing olefins using the catalysts of the invention are described, for example, in U.S. Pat. Nos. 5,902,866, 5,637,659, and 5,539,124, the teachings of which are incorporated herein by reference.

The following examples merely illustrate the invention. Those skilled in the art will recognize many variations that are within the spirit of the invention and scope of the claims.

EXAMPLE 1

Preparation of an Activator from Triethylaluminum and a Boronic Acid

Pentafluorophenylboronic acid (121 mg, 0.578 mmol) is added in small portions to a stirred solution of triethylaluminum (319 mg, 2.80 mmol) in toluene (2.0 mL) at room temperature in a dry-box. The resulting homogeneous solution is stirred for an additional 15 min. before use.

EXAMPLE 2

Preparation of a Supported Indenoindolyl Zirconium Catalyst

A portion of the activator solution prepared in Example 1 (1.0 mL) is added slowly to a stirred bed of silica (MS-3050 silica, product of PQ, calcined at 250° C. for 4 h, 1.97 g). In a separate vial, (5,8-dimethyl-5,10-dihydroindeno[1,2-b]indolyl)cyclopentadienylzirconium dichloride (8.0 mg) is added to another portion (1.0 mL) of activator solution at room temperature, and the mixture is stirred for 15 min. The resulting dark-violet solution is added to a stirred bed of the activator-pretreated silica to give a free-flowing catalyst powder.

EXAMPLE 3

Ethylene Copolymerization with 1-Butene

A dry, two-liter, stainless-steel reactor is charged with isobutane (800 mL), followed by 1-butene (200 mL) and triisobutylaluminum (0.10 mL of 1.0 M solution in hexane). The stirred reactor is heated to the desired polymerization temperature of 70° C. and pressurized to 350 psi with ethylene. A sample of the supported catalyst from Example 2 (0.31 g) is injected into the reactor to produce, after 30 min., a copolymer of ethylene and 1-butene (29.6 g), corresponding to an activity of 426 kg PE/g Zr/h. Polymer properties: MI (melt index)=0.4; MFR (melt-flow ratio)=19.3; $T_m$=106.3° C.; density=0.9157 g/cm$^3$.

COMPARATIVE EXAMPLE 4

Preparation of a Catalyst from Bis(cyclopentadienyl)zirconium Dichloride

A catalyst is prepared by the method of Example 2, except that bis(cyclopentadienyl)zirconium dichloride (5.0 mg) is used instead of the indenoindolyl zirconium complex.

COMPARATIVE EXAMPLE 5

Ethylene Copolymerization with 1-Butene

Ethylene is copolymerized with 1-butene as described in Example 3, except that the catalyst prepared in Comparative Example 4 (0.79 g) is used. After 30 min. of polymerization, the copolymer (7.4 g) is isolated, corresponding to an activity of 47.3 kg PE/g Zr/h.

EXAMPLE 6

Activation of an Indenoindolyl Zirconium Complex with an Aluminoboronate and an Alumoxane Pentafluorophenylboronic acid (39 mg, 0.18 mmol) is added to a stirred solution of trimethylaluminum (0.5 mL of 2M solution in toluene) at room temperature in a dry-box. To the resulting homogeneous solution, (5,8-dimethyl-5,10-dihydroindeno[1,2-b]indolyl)cyclopentadienylzirconium dichloride (40 mg) is added, followed by polymethylalumoxane (PMAO, product of Akzo, 13% solution (Al) in toluene, 1.0 mL).

Trimethylaluminum (0.5 mL of 2M solution in toluene) is added to a silica support (Davison 948 silica, calcined at 250° C. for 4 h, 1.01 g). The catalyst solution is added to the pretreated silica to give a free-flowing catalyst powder.

Ethylene is copolymerized with 1-butene by the method of Example 3 using the supported catalyst described above (40 mg). After 30 min., the copolymer (45.3 g) is isolated, corresponding to an activity of 651 kg PE/g Zr/h. Polymer properties: MI=0.63; MFR=21.4; $T_m$=105.1° C.

COMPARATIVE EXAMPLE 7

Activation of an Indenoindolyl Zirconium Complex with Only an Alumoxane

PMAO (2.48 mL of 13% (Al) solution in toluene) is added slowly to a stirred bed of silica (MS-3050 silica from PQ, calcined at 250° C. for 4 h, 2.0 g). In a separate flask, (5,8-dimethyl-5,10-dihydroindeno[1,2-b]-indolyl) cyclopentadienylzirconium dichloride (80 mg) is added at room temperature to more PMAO solution (4.95 mL), and the mixture is stirred for 15 min. The resulting deep-red solution is added to a stirred bed of the activator-pretreated silica to give a free-flowing catalyst powder.

Ethylene is copolymerized with 1-butene according to the method of Example 3 using the supported catalyst described above (185 mg) to give, after 30 min., a copolymer (89.4 g), corresponding to an activity of 501 kg PE/g Zr/h. Polymer properties: Ml=1.24; MFR=19.2; $T_m$=104.9° C.; density =0.9100 g/cm$^3$.

COMPARATIVE EXAMPLE 8

Activation of a Bis(cyclopentadienyl)zirconium Complex with an Aluminoboronate and an Alumoxane A catalyst is prepared by the method of Example 6, except that bis(cyclopentadienyl)zirconium dichloride (263 mg) is used instead of the indenoindolyl zirconium complex.

Ethylene is copolymerized with 1-butene according to the method of Example 3 using the supported catalyst (47 mg) described above. After 30 min, the polymer (3.1 g) is isolated, corresponding to an activity of 28.5 kg PE/g Zr/h.

The preceding examples are meant only as illustrations. The following claims define the invention.

We claim:

1. A catalyst system which comprises:
   (a) an organometallic complex which comprises a Group 3–10 transition metal, M, and at least one indenoindolyl ligand that is pi-bonded to M; and
   (b) an activator which comprises the reaction product of an alkylaluminum compound and an organoboronic acid.

2. The catalyst system of claim 1 wherein the organometallic complex comprises a Group 4–6 transition metal.

3. The catalyst system of claim 1 wherein the organometallic complex comprises a Group 4 transition metal.

4. The catalyst system of claim 1 wherein the indenoindolyl ligand has a structure selected from the group consisting of:

a)

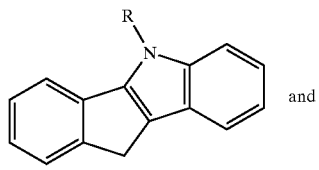
and b)

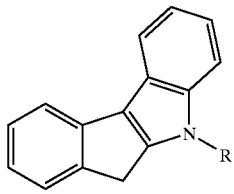

in which each ring atom is unsubstituted or substituted with one or more alkyl, aryl, aralkyl, halogen, silyl, nitro, dialkylamino, diarylamino, alkoxy, aryloxy, or thioether groups.

5. The catalyst system of claim 1 wherein the organometallic complex further incorporates a polymerization-stable ligand selected from the group consisting of cyclopentadienyl, indenyl, fluorenyl, boraaryl, azaborolinyl, carbazolyl, pyrrolyl, indolyl, 8-quinolinoxy, and 2-pyridinoxy.

6. The catalyst system of claim 1 wherein the organometallic complex incorporates a labile ligand selected from the group consisting of halide, alkyl, aryl, aralkyl, alkoxy, aryloxy, dialkylamino, and siloxy.

7. The catalyst system of claim 1 wherein the indenoindolyl ligand is bridged to another ligand.

8. The catalyst system of claim 1 wherein the alkylaluminum compound is selected from the group consisting of trimethylaluminum and triethylaluminum.

9. The catalyst system of claim 1 wherein the organoboronic acid is a polyfluoroaryl boronic acid.

10. The catalyst system of claim 9 wherein the polyfluoroaryl boronic acid is pentafluorophenylboronic acid.

11. The catalyst system of claim 1 further comprising an alkyl alumoxane.

12. A supported catalyst system of claim 1.

13. The catalyst system of claim 12 wherein the support is selected from the group consisting of silicas and aluminum phosphates.

14. A catalyst system which comprises:
   (a) an organometallic complex which comprises a Group 4 transition metal, M, and at least one indenoindolyl ligand that is pi-bonded to M; and
   (b) an activator which comprises the reaction product of (1) an alkylaluminum compound selected from the group consisting of trimethylaluminum and triethylaluminum and (2) a polyfluoroaryl boronic acid.

15. A supported catalyst system of claim 14.

* * * * *